Oct. 9, 1962     C. J. WHEELER     3,057,106

LINE RELEASE ATTACHMENT

Filed May 26, 1961

INVENTOR.

CHARLES J. WHEELER

BY

McMorrow, Berman + Davidson

ATTORNEYS

United States Patent Office 3,057,106
Patented Oct. 9, 1962

3,057,106
LINE RELEASE ATTACHMENT
Charles J. Wheeler, Durant, Okla., assignor to W. L. Jordan and Mollie Lee Farrell, both of Durant, Okla.
Filed May 26, 1961, Ser. No. 113,013
3 Claims. (Cl. 43—25)

This invention pertains to a line release attachment, and more specifically, to new and novel improvements in line control means for fishing rod and reel assemblies of the casting variety.

A primary object of this invention is to provide line release means for use in casting, which means is effective to release the fishing line automatically upon abrupt halting of the downward movement of the fishing rod during the normal casting operation.

Another object resides in the provision of means for securely holding a fishing line during the casting movement until such time as release is desired. By utilization of this expedient, it is possible for the fisherman to significantly reduce the likelihood of entanglement of the fishing line in overhanging obstacles such as tree branches, and the like, while, at the same time, providing sufficient force in the cast to reach a distant target.

A further object resides in supplying a fishing rod attachment which may readily be detached from the fishing rod during storage or transportation, but which is securely located thereon in use.

Other and further objects and advantages will become apparent from consideration of the following specification when read in conjunction with the annexed drawing, in which.

Figure 1:
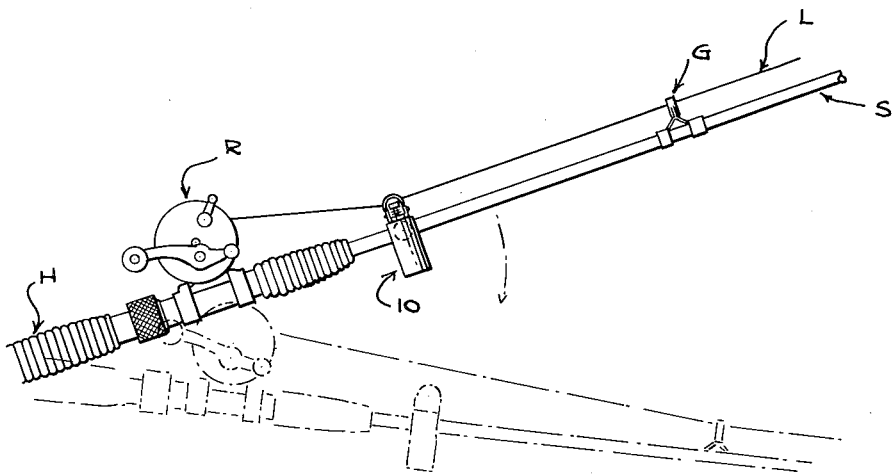
FIGURE 1 is a side elevational view of a portion of a rod and reel assembly with the attachment of this invention mounted thereon, the assembly being shown in phantom lines at the extreme downward position during the casting operation.
Figure 2:
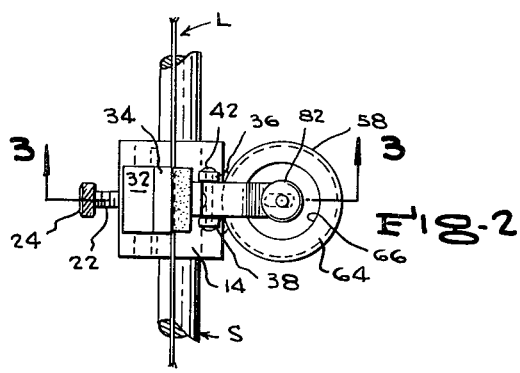
FIGURE 2 is an enlarged top plan view of the attachment and a portion of the fishing rod shaft.

Proceeding now in detail to the drawing, and specifically to FIGURE 1, illustrated therein is a conventional rod and reel assembly including a handle H, reel R, shaft S, and line L. The line L extends through a plurality of guides G spaced along the shaft S, and normally travels between the reel R and the first guide G in the path illustrated in the phantom line portion of FIGURE 1.

Figure 3:
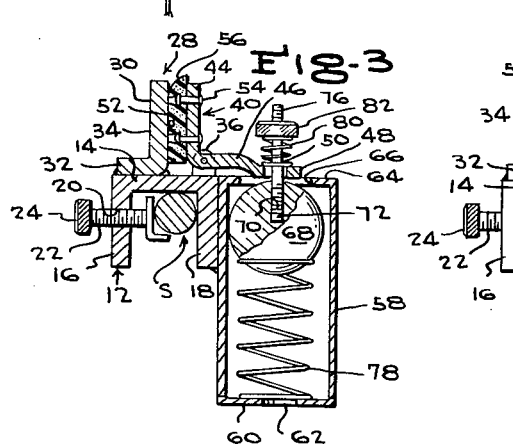
FIGURE 3 is a vertical cross-sectional view taken substantially on section line 3—3 of FIGURE 2, looking in the direction of the arrows.
Figure 4:
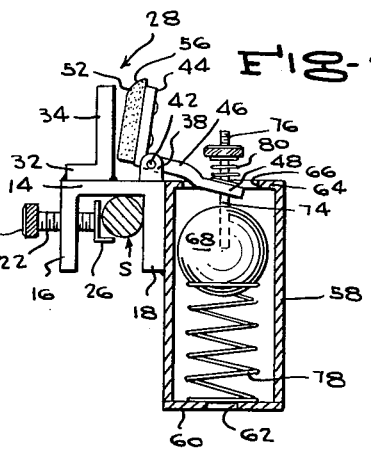
FIGURE 4 is a view similar to FIGURE 3, partly in section, showing the attachment in an open position.

Generally designated by reference character 10 is the line release attachment of this invention. The attachment 10 includes a saddle element 12 of U-shaped cross-section including a substantially rectangular bight portion 14 and a pair of spaced and confronting, generally rectangular arms 16, 18. The distance between the arms 16 and 18 is such that the rod shaft S is received therebetween, and the arm 16 has a threaded aperture 20 formed therein in which is received a screw element 22 having an outer knurled head 24 and an L-shaped clamp element 26. The clamp element 26 is connected to the screw 22 in such manner that it does not rotate therewith, and as seen in FIGURES 3 and 4, the location is such that it serves to securely clamp the rod shaft S in one corner of the saddle 12.

Line clamp means 28 are provided and include a fixed L-shaped element 30 having a foot portion 32 secured by welds or the like to the upper side of the bight portion 14, and an upstanding leg member 34. A pair of upstanding connection ears 36, 38 project from the bight portion 14, and a second substantially L-shaped element 40 is pivotally secured between the ears 36 and 38 by means of a pivot pin 42. The second L-shaped element 40 includes a normally upstanding movable member 44 and a lateral leverage member 46 having an offset outer portion 48, apertured at 50. It will be noted that the inner face of the upstanding member 44 is provided with a rectangular pad 52 formed of resilient sponge rubber or the like which is secured in place by rivets 54 and includes a tapered upper end 56.

An elongated, substantially tubular cylinder 58 is fixedly secured to the side arm 18 the longitudinal axis of the cylinder being substantially parallel with said arm. Cylinder 58 includes a lower end wall 60 with air relief aperture 62, and an upper end wall 64 apertured at 66 for a purpose described below. Inserted within the cylinder 58 during fabrication is a spherical weight element 68 having a threaded bore 70 therein which receives one end 72 of a cylindrical rod 74. The opposite threaded end 76 of rod 74 projects upwardly and outwardly of the cylinder 58 through the aperture 66. Weight element 68 rests on a helicoidal compression spring 78 supported at its distal end on the end wall 60.

The rod 74 projects through the aperture 66 in cylinder 58 and through the aperture 50 in the offset outer portion 48 of leverage member 46. A second compression spring 80 is placed about the rod 74 above the offset portion 48 of the leverage member 46. An adjustment nut 82 is threadedly received on the end portion 76 of rod 74 and serves to adjust the tension of spring 80 to correctly locate the leverage member in the closed position of FIGURE 3.

In use, the device is positioned on the rod shaft S at the illustrated location. The leverage member 46 is manually depressed, thus pivoting of the upstanding member 44 away from the fixed upstanding member 34 and the line L is passed therebetween. Upon release of the leverage member, line L is clamped in the leg portion 34 of the upstanding member 30 and the resilient pad 52 on the upstanding member 44. The rod is then manipulated in the usual manner, that is, the user moves the rod sharply from an overhead position toward the casting target at which location the cast is abruptly halted. This results in a continued movement of the weight element 68 against the resistance of the springs 78 and 80 and in the exertion of sufficient force to again pivot the upstanding member 46 away from the fixed upstanding member 34, thereby releasing the line at the appropriate time to insure accuracy in casting at the target.

The location of the attachment 10 below the normal path of travel of the line L insures that the device will not interfere with the normal functioning of the fishing rod during retrieve of the line.

Having described and illustrated one embodiment of this invention in detail, it will be understood that this description and illustration are offered merely by way of example, and that the invention is to be limited only by the scope of the appended claims.

What is claimed is:
1. A line release attachment for use with a fishing rod and reel assembly which includes a rod having a handle and a shaft, a reel mounted on the handle, and a fishing line extending from the reel along said shaft, the line release attachment comprising:
(a) line-clamping means which includes a saddle element of inverted U-shape having a bight portion and a pair of depending side arms;
(b) means releasably securing said saddle element to the rod shaft forwardly of the reel;
(c) a first upright element fixedly secured to the bight portion at a location below the normal path of travel of the line;

(d) a second upright element pivotally secured to said bight portion, the second upright element being of L-shape and including an elongated leverage arm which extends outwardly of the saddle element, the second upright element being adapted to engage the fishing line against the first upright element;

(e) a cylinder secured to one of the side arms of said saddle;

(f) an inertially-actuated weight element disposed in said cylinder;

(g) spring means for normally maintaining the weight element in one location in said cylinder; and (h) linkage means extending from said one weight element and connected to the leverage arm whereby movement of the weight element within the cylinder to a second location is effective to cause downward movement of the leverage arm thereby releasing the line.

2. A line release attachment for use with a fishing rod and reel assembly which includes a rod having a handle and a shaft, a reel mounted on the handle, and a fishing line extending from the reel along said shaft, the line release attachment comprising:

(a) clamp means secured to the rod shaft;

(b) a fixed upright element secured to the clamp means outside the normal path of travel of the fishing line;

(c) a movable upright element secured to the clamp means and adapted to engage the fishing line against the fixed upright element; and (d) an inertially-actuated weight means yieldably secured to the movable upright element and adapted to move the same away from the fixed upright element whereby the fishing line is released.

3. A line release attachment for use with a fishing rod and reel assembly which includes a rod having a handle and a shaft, a reel mounted on the handle, and a fishing line extending from the reel along said shaft, the line release attachment comprising:

(a) clamp means secured to the rod shaft;

(b) a fixed upright element secured to the clamp means;

(c) a movable upright element secured to the clamp means and adapted to engage the fishing line against the fixed upright element; and (d) an inertially-actuated weight means yieldably secured to the movable upright element and adapted to move the same away from the fixed upright element whereby the fishing line is released.

References Cited in the file of this patent

UNITED STATES PATENTS

| | | |
|---|---|---|
| 881,970 | Spiro | Mar. 17, 1908 |
| 1,251,221 | Greenwald | Dec. 25, 1917 |
| 1,871,719 | Meader | Aug. 16, 1932 |
| 2,527,385 | Alix et al. | Oct. 24, 1950 |
| 2,581,671 | Katter | Jan. 8, 1952 |
| 2,713,228 | Grunwald | July 19, 1955 |
| 2,791,858 | Kernodle | May 14, 1957 |
| 2,804,711 | Kozar | Sept. 3, 1957 |
| 2,829,461 | Tuttle | Apr. 8, 1958 |

FOREIGN PATENTS

| | | |
|---|---|---|
| 1,054,576 | France | Oct. 7, 1953 |